United States Patent
Mizutani et al.

(10) Patent No.: US 10,277,417 B2
(45) Date of Patent: Apr. 30, 2019

(54) CONTROL SYSTEM, CONTROL APPARATUS AND CONTROL METHOD WITH INPUT-ONLY COMMUNICATION FRAME

(71) Applicant: OMRON Corporation, Kyoto-shi, Kyoto (JP)

(72) Inventors: Seiji Mizutani, Moriyama (JP); Tianbing Li, Osaka (JP); Mitsuhiro Yoneda, Tenri (JP)

(73) Assignee: OMRON Corporation, Kyoto-shi (JP)

( * ) Notice: Subject to any disclaimer, the term of this patent is extended or adjusted under 35 U.S.C. 154(b) by 325 days.

(21) Appl. No.: 15/122,517

(22) PCT Filed: Jan. 15, 2015

(86) PCT No.: PCT/JP2015/050921
§ 371 (c)(1),
(2) Date: Aug. 30, 2016

(87) PCT Pub. No.: WO2015/133175
PCT Pub. Date: Sep. 11, 2015

(65) Prior Publication Data
US 2017/0099158 A1    Apr. 6, 2017

(30) Foreign Application Priority Data

Mar. 4, 2014    (JP) .................................. 2014-041535

(51) Int. Cl.
*H04L 12/40* (2006.01)
*H04L 12/423* (2006.01)
(Continued)

(52) U.S. Cl.
CPC .......... *H04L 12/423* (2013.01); *G05B 19/054* (2013.01); *H04L 12/403* (2013.01); *H04L 12/40019* (2013.01); *G05B 2219/1215* (2013.01)

(58) Field of Classification Search
CPC ............. H04L 12/423; H04L 12/40019; H04L 12/403; G05B 19/054; G05B 2219/1215
See application file for complete search history.

(56) References Cited

U.S. PATENT DOCUMENTS

| | | | |
|---|---|---|---|
| 2010/0074262 A1* | 3/2010 | Breit | ..................... H04L 12/403 370/400 |
| 2012/0023277 A1* | 1/2012 | Graf | ................... G05B 19/0423 710/110 |

(Continued)

FOREIGN PATENT DOCUMENTS

| | | |
|---|---|---|
| CN | 103403633 A | 11/2013 |
| CN | 104126155 A | 10/2014 |

(Continued)

OTHER PUBLICATIONS

Extended European search report dated Aug. 2, 2017 in the counterpart European patent application.

(Continued)

*Primary Examiner* — Viet D Vu
(74) *Attorney, Agent, or Firm* — Metrolexis Law Group, PLLC

(57) ABSTRACT

A control system includes a master apparatus that includes a calculation unit and a communication processing unit, and one or more slave apparatuses connected to the master apparatus via a network. The communication processing unit is configured to manage cyclic transmission, on the network, of a data sequence containing data that is handled by the master apparatus and the one or more slave apparatuses. The communication processing unit is configured to start cyclic transmission of a first data sequence that contains output data for the one or more slave apparatuses in conjunction with execution of output processing in the operation unit, and to start, a predetermined time period before execution start of input processing in the operation unit, cyclic (Continued)

transmission of a second data sequence for obtaining information collected by the one or more slave apparatuses from the control target.

17 Claims, 8 Drawing Sheets

(51) Int. Cl.
*H04L 12/403* (2006.01)
*G05B 19/05* (2006.01)

(56) References Cited

U.S. PATENT DOCUMENTS

| | | | |
|---|---|---|---|
| 2012/0185625 A1* | 7/2012 | Kolblin | G05B 15/02 710/104 |
| 2014/0012402 A1 | 1/2014 | Nishiyama et al. | |
| 2015/0058432 A1 | 2/2015 | Mizutani | |
| 2015/0168946 A1* | 6/2015 | Duvvuri | G05B 19/41855 700/20 |
| 2015/0362903 A1 | 12/2015 | Ono et al. | |

FOREIGN PATENT DOCUMENTS

| | | |
|---|---|---|
| CN | 104956273 A | 9/2015 |
| EP | 2687927 A1 | 1/2014 |
| JP | 2001-147905 A | 5/2001 |
| JP | 1793585 B2 | 10/2011 |
| WO | 2013137023 A1 | 9/2013 |

OTHER PUBLICATIONS

The Office action dated Aug. 30, 2018 in a counterpart Chinese patent application.

* cited by examiner (a)

(b)

CONTROL SYSTEM, CONTROL APPARATUS AND CONTROL METHOD WITH INPUT-ONLY COMMUNICATION FRAME

TECHNICAL FIELD

The present invention relates to a control system, a control apparatus and a control method used for controlling the operations of machinery, equipment, and the like.

RELATED ART

Machinery and equipment used in many manufacturing sites are typically controlled by a control system including a Programmable Logic Controller (hereinafter, also referred to as a "PLC") and the like. Such a control system collects information from external switches, sensors and the like, and outputs command values obtained by predetermined control calculation.

This collection of field information and output of command values are performed via a network in most cases. For example, JP 2001-147905 A (Patent Document 1) discloses a programmable controller system constituted by connecting at least one or more CPU modules and a plurality of I/O modules to a ring-shaped bus.

RELATED ART DOCUMENTS

Patent Documents

Patent Document 1: JP 2001-147905 A

SUMMARY OF THE INVENTION

Problem to be Solved by the Invention

In the case of transmitting field information and command values (hereinafter, collectively referred to as "IO (Input/Output) data" as well) via a network as described above, a certain amount of transmission time is required. If a transmission time is sufficiently short relative to an execution cycle of a control-related program, no major problem arises, but if the program execution cycle is attempted to be shortened, the transmission time can be a problem. JP 2001-147905 A (Patent Document 1) above does not mention such a problem.

Accordingly, there is a demand for a mechanism that makes it possible to repeatedly execute a program required for controlling a control target in a shorter cycle.

Means for Solving the Problems

According to an aspect of the present invention, a control system for controlling a control target (an object to be controlled) is provided. The control system includes a master apparatus including a calculation unit and a communication processing unit, and one or more slave apparatuses connected to the master apparatus via a network. The communication processing unit is configured to manage cyclic transmission, on the network, of a data sequence containing data that is handled by the master apparatus and the one or more slave apparatuses. The calculation unit is configured to repeatedly execute output processing and input processing in a predetermined execution cycle, and to repeat program execution processing during a time period when the output processing and the input processing are not executed. The input processing includes processing for updating input data in accordance with information that is collected from the control target by the one or more slave apparatuses. The output processing includes processing for generating output data that includes an execution result of the program execution processing. The communication processing unit is configured to start cyclic transmission of a first data sequence containing the output data for the one or more slave apparatuses in conjunction with execution of the output processing in the calculation unit, and to start, a predetermined time period before execution start of the input processing in the calculation unit, cyclic transmission of a second data sequence for obtaining information collected by the one or more slave apparatuses from the control target.

Preferably, after the first data sequence is sent out, the communication processing unit sends out the second data sequence, independently from arrival of the first data sequence at the master apparatus.

Preferably, the first data sequence and the second data sequence have the same data structure.

Preferably, both the first data sequence and the second data sequence include a command for obtaining information from the one or more slave apparatuses and the output data.

More preferably, the output data contained in the second data sequence is invalidated.

Alternatively, more preferably, each of the one or more slave apparatuses is configured to discard the output data contained in the second data sequence.

Preferably, the master apparatus determines a timing of sending out the second data sequence based on an offset value stored in advance, using the timing of execution start of the input processing as a reference.

More preferably, the master apparatus determines the offset value based on the initial configuration result of the network.

A control apparatus for controlling a control target according to another aspect of the present invention includes a calculation unit, and a communication processing unit coupled to the calculation unit. The control apparatus is connected to one or more slave apparatuses via a network. The communication processing unit is configured to manage cyclic transmission, on the network, of a data sequence containing data that is handled by the control apparatus and the one or more slave apparatuses. The calculation unit is configured to repeatedly execute output processing and input processing in a predetermined execution cycle, and to repeat program execution processing during a time period when the output processing and the input processing are not executed. The input processing includes processing for updating input data in accordance with information that is collected from the control target by the one or more slave apparatuses, and the output processing includes processing for generating output data that includes an execution result of the program execution processing. The communication processing unit is configured to start cyclic transmission of a first data sequence containing the output data for the one or more slave apparatuses, in conjunction with execution of the output processing in the calculation unit, and to start, a predetermined time period before execution start of the input processing in the calculation unit, cyclic transmission of a second data sequence for obtaining information collected by the one or more slave apparatuses from the control target.

In a control method in a control apparatus for controlling a control target according to yet another aspect of the present invention, the control apparatus is connected to one or more slave apparatuses via a network, and is configured to manage cyclic transmission, on the network, of a data sequence containing data that is handled by the control apparatus and the one or more slave apparatuses. The control method includes a step of repeatedly executing output processing and input processing in a predetermined execution cycle and repeating program execution processing during a time period when the output processing and the input processing are not executed. The input processing includes processing for updating input data in accordance with information that is collected from the control target by the one or more slave apparatuses, and the output processing includes processing for generating output data that includes an execution result of the program execution processing. The control method further includes a step of starting cyclic transmission of a first data sequence containing the output data for the one or more slave apparatuses in conjunction with execution of the output processing, and a step of starting, a predetermined time period before execution start of the input processing, cyclic transmission of a second data sequence for obtaining information collected by the one or more slave apparatuses from the control target.

Effects of the Invention

According to a control system according to an aspect of the present invention, it is possible to repeatedly execute a program required for controlling a control target in a shorter cycle.

EMBODIMENTS OF THE INVENTION

Figure 1:
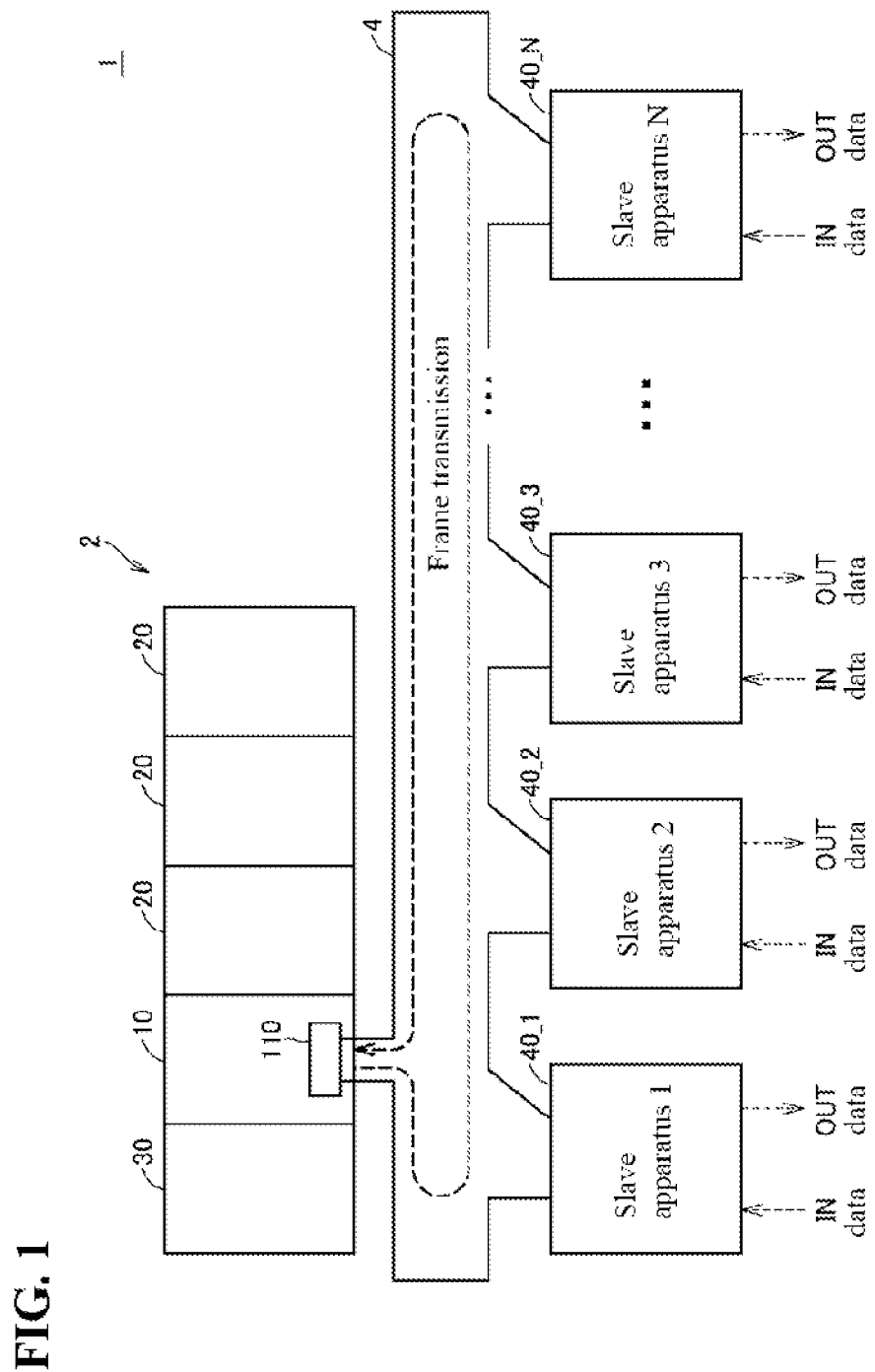
FIG. 1 is a schematic diagram showing an entire configuration of a PLC system according to an embodiment of the present invention.

An embodiment of the present invention will be described in detail with reference to the drawings. Note that the same reference numerals are given to the same or corresponding constituent elements in the drawings, and description thereof is not repeated.

In this embodiment, a system centered on a PLC will be illustrated as an example of a control system. However, as such a control system, it is not only possible to adopt a configuration in which the system is centered on a PLC, but also a configuration in which the system is centered on various industrial computers. Furthermore, if a new processing apparatus (calculation apparatus) is developed by progress of technology, such a new processing apparatus can also be adopted.

A. ENTIRE CONFIGURATION OF PLC SYSTEM

First, the entire configuration of a PLC system 1 according to this embodiment, which is one mode of a control system, will be described. FIG. 1 is a schematic diagram showing the entire configuration of the PLC system 1 according to this embodiment.

Referring to FIG. 1, the PLC system 1 is a control system for controlling a control target, and includes a main processing apparatus 2, one or more remote apparatuses 40_1, 40_2, 40_3, . . . , 40_N (hereinafter, may be collectively referred to as "the remote apparatuses 40"). The main processing apparatus 2 and the remote apparatuses 40 are control apparatuses that constitute at least a portion of the PLC system 1, and are connected via a field network 4.

Communication via the field network 4 is independently controlled by the main processing apparatus 2. Specifically, the main processing apparatus 2 sends out data to be sequentially transmitted on the field network 4 in accordance with a predetermined timing or rule. In the following description, data that is sequentially transmitted on the field network 4 is also called a "communication frame". In this context, the main processing apparatus 2 is also called a "master apparatus", and each of the remote apparatuses 40_1, 40_2, 40_3, . . . , 40_N is also called a "slave apparatus".

The main processing apparatus 2 realizes processing for collecting input signals (hereinafter, referred to as "field information" or "IN data" as well) from external switches, sensors and the like, processing for performing control calculation based on the collected field information, and processing for giving command values (hereinafter, also referred to as "OUT data") calculated by control calculation to an external relays or actuators, and the like, by executing a program required for controlling a control target (including a user program, a system program and the like, as will be described later).

The main processing apparatus 2 includes a CPU unit 10, one or more IO units 20, and a power supply unit 30 as the apparatus configuration. The CPU unit 10 and the IO units 20 are connected via an internal bus (not illustrated) so as to enable mutual data communication. The power supply unit 30 supplies electrical power of an appropriate voltage to the CPU unit 10 and the IO units 20.

The CPU unit 10 includes the calculation unit for executing a program required for controlling a control target, and a communication controller 110 corresponding to the communication processing unit for controlling communication with the remote apparatuses 40 via the field network 4.

The remote apparatuses 40 receive field information from external switches or sensors, and transmit the received field information (IN data) to the main processing apparatus 2 via the field network 4. In addition, the remote apparatuses 40 output command values (OUT data) received from the main processing apparatus 2 via the field network 4 to the external relays and actuators. Alternatively, the remote apparatuses 40 may operate by themselves in accordance with the command values (OUT data) received via the field network 4. For example, a simple IO unit that does not have a calculation function, an IO unit that has a calculation function, an apparatus that includes an actuator such as a motion controller and the like are envisioned as the remote apparatuses 40.

The communication controller 110 of the CPU unit 10 is configured to manage cyclic transmission, on the field network 4, of data sequences (In this embodiment, also referred to as "communication frames") containing data that is handled by the main processing apparatus 2 (master apparatus) and the one or more remote apparatuses 40 (slave apparatuses). Note that in FIG. 1, a ring type network is schematically shown, but a daisy chain-connected network as will be described later may also be used. In other words, any configuration may be adopted as a network according to this embodiment, as long as a data sequence (communication frame) can be cyclically transmitted. Typically, communication processing according to this embodiment can also be applied to a total frame type network.

B. APPARATUS CONFIGURATION OF CPU UNIT 10

Figure 2:
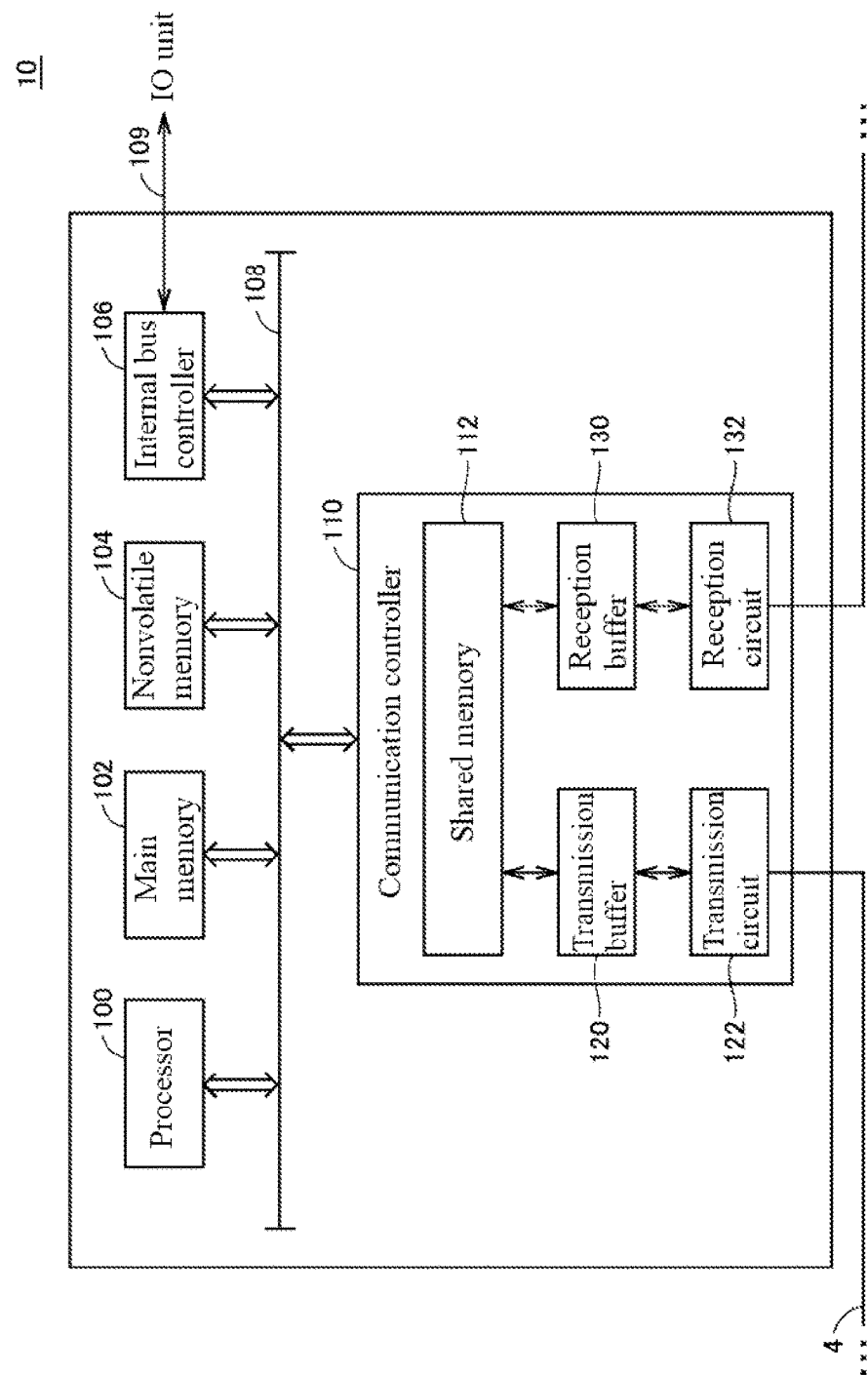
FIG. 2 is a schematic diagram showing an apparatus configuration of a CPU unit included in the PLC system according to the embodiment.

Next, the apparatus configuration of the CPU unit 10 included in the PLC system 1 according to this embodiment will be described. FIG. 2 is a schematic diagram showing the apparatus configuration of the CPU unit 10 included in the PLC system 1 according to this embodiment.

Referring to FIG. 2, the CPU unit 10 includes, in addition to the communication controller 110, which is a communication processing unit, a processor 100, which is a calculation unit, a main memory 102, a nonvolatile memory 104 and an internal bus controller 106. Those components are configured so as to enable mutual data communication via internal bus 108.

The processor 100 executes a control-related program. The processor 100 reads out a necessary program from the nonvolatile memory 104 or the like, and deploys the program in the main memory 102 and executes the program. Typically, control-related programs include user programs and system programs.

An internal bus controller 106 is connected to the IO units 20 via an internal bus 109, and mediates data (IN data and OUT data) exchange between the processor 100 and the IO units 20.

The communication controller 110 is connected to the remote apparatuses 40 via the field network 4, and mediates data (IN data and OUT data) exchange between the CPU unit 10 and the remote apparatus 40. More specifically, the communication controller 110 includes a shared memory 112, a transmission buffer 120, a transmission circuit 122, a reception buffer 130 and a reception circuit 132.

The transmission buffer 120 and the transmission circuit 122 realize processing related to sending frames from the communication controller 110 to an external apparatus, and the reception buffer 130 and the reception circuit 132 realize processing related to sending frames from the external apparatus to the communication controller 110. The communication controller 110 includes the shared memory 112, and the processor 100 directly accesses the shared memory 112, writes OUT data, and obtains IN data. Specifically, the OUT data written in the shared memory 112 is transferred to the transmission buffer 120, and is sent out from the transmission buffer 120 to the external apparatus. Also, IN data obtained from an external apparatus is received by the reception buffer 130 and after that, is transferred to the shared memory 112.

A portion of or the entire communication controller 110 may be realized using software. Alternatively, a portion of or the entire communication controller 110 may be realized using a hardware circuit such as an ASIC (Application Specific Integrated Circuit) or an FPGA (Field-Programmable Gate Array).

C. APPARATUS CONFIGURATION OF REMOTE APPARATUS 40

Figure 3:
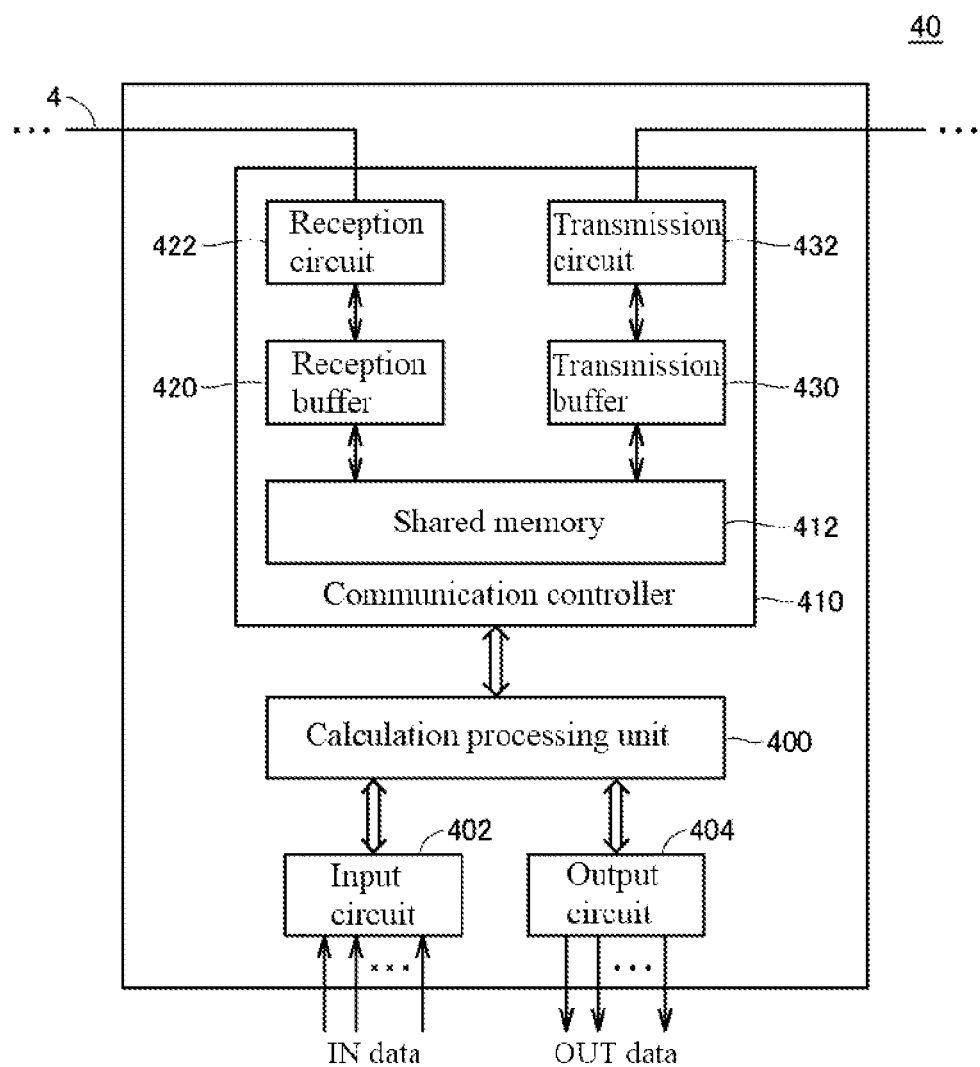
FIG. 3 is a schematic diagram showing an example of an apparatus configuration of a remote apparatus included in the PLC system according to the embodiment.

Next, the apparatus configuration of the remote apparatus 40 included in the PLC system 1 according to this embodiment will be described. FIG. 3 is a schematic diagram showing an example of the apparatus configuration of the remote apparatus 40 included in the PLC system 1 according to this embodiment.

Various configurations can be adopted as the remote apparatus 40 according to this embodiment, but in FIG. 3, a configuration example is shown in which a calculation function and an IO function are included. Referring to FIG. 3, the remote apparatus 40 includes a calculation processing unit 400, an input circuit 402, an output circuit 404 and a communication controller 410.

The calculation processing unit 400 executes predetermined processing based on data transmitted via the field network 4, and sends out, via the field network 4, data obtained as a result of the processing.

The input circuit 402 outputs, to the calculation processing unit 400, information (digital values) indicating signal values (IN data) that have been input from the field side. The output circuit outputs, to the field side, signals that are based on OUT data given from the calculation processing unit 400.

The communication controller 410 is connected to the CPU unit 10 via the field network 4, and mediates data (IN data and OUT data) exchange between the remote apparatuses 40 and the CPU unit 10. More specifically, the communication controller 410 includes a shared memory 412, a reception buffer 420, a reception circuit 422, a transmission buffer 430 and a transmission circuit 432. These components have similar functions as the above-described shared memory 112, transmission buffer 120, transmission circuit 122, reception buffer 130 and reception circuit 132 (see FIG. 2 for all these components), and thus their detailed description is not repeated. However, the processing when a communication frame is received by the communication controller 410, which is a portion of a slave apparatus, and the processing when a communication frame is transmitted are different from the processing in a communication controller 110 of the CPU unit 10, which is a master apparatus.

A portion of or all the functions of the remote apparatus 40 (the calculation processing unit 400, the input circuit 402, the output circuit 404 and the communication controller 410) may be realized using software, but it is preferred to realize a portion of or all the functions of the remote apparatus 40 using a hardware circuit such as an ASIC and FPGA.

D. FIELD NETWORK

Next, communication processing in the field network 4 will be described.

As a communication system in the field network 4, a system that enables data transmission in a predetermined communication cycle (in other words, a system that enables real time communication) is preferred. As an example, various types of industrial Ethernet (registered trademark) can be used as the field network 4. Specific examples of industrial Ethernet (registered trademark) include EtherCAT (registered trademark), PROFINET IRT, MECHATROLINK (registered trademark)-III, Powerlink, SERCOS (registered trademark)-III, CIP Motion and the like. In the following description, as a typical example, a configuration example using EtherCAT (registered trademark) will be described.

Figure 4:
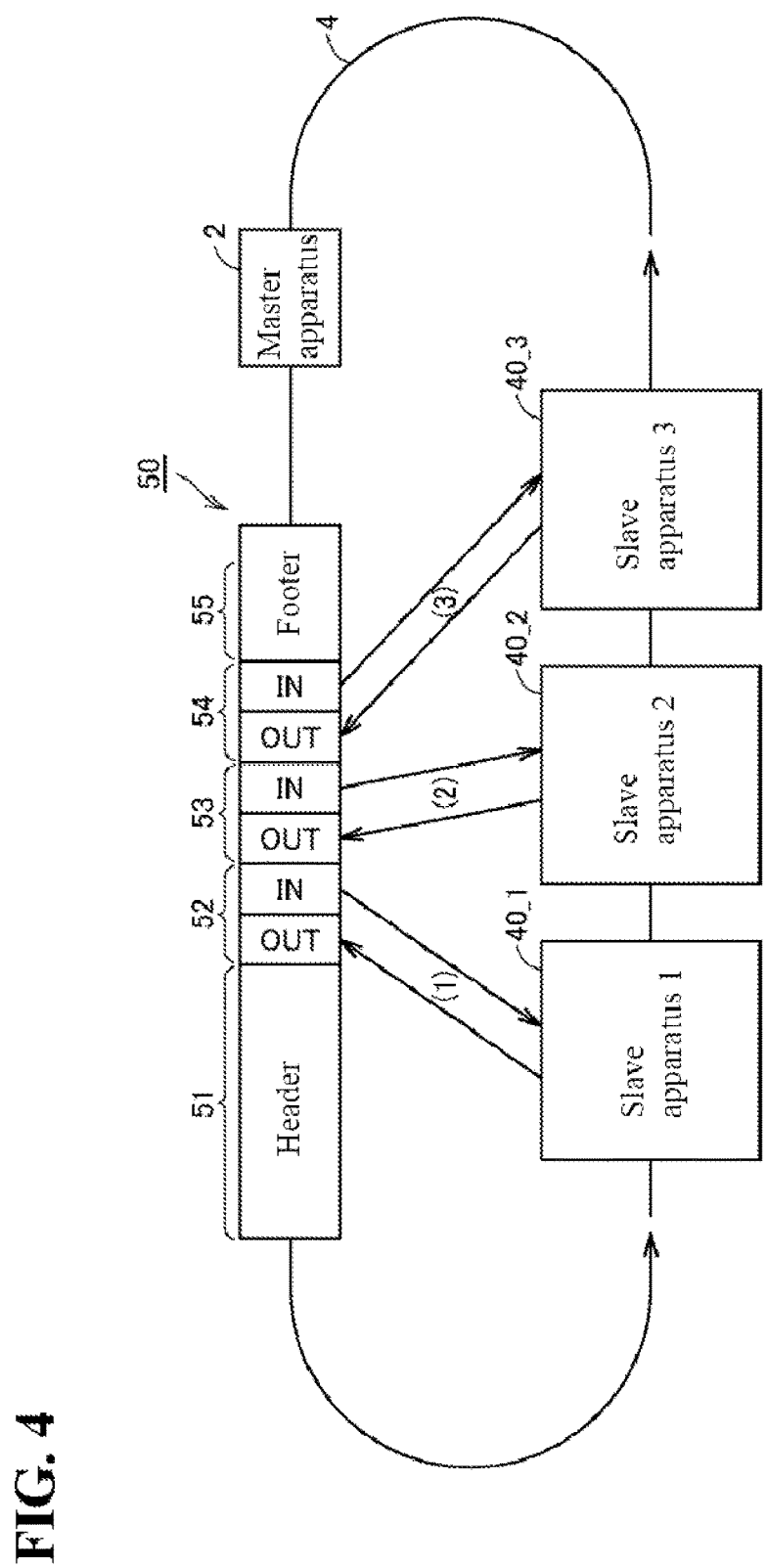
FIG. 4 is a diagram illustrating a communication frame transmitted on a field network according to the embodiment.

FIG. 4 is a diagram illustrating a communication frame transmitted on the field network 4 according to this embodiment. As shown in FIG. 4, a communication frame 50 is cyclically transmitted on the field network 4. Specifically, the communication frame 50 sent out from the main processing apparatus 2, which is a master apparatus, will be sequentially transferred to the remote apparatuses 40_1, 40_2 and 40_3 that are slave apparatuses. The communication frame 50 transferred to all the remote apparatuses 40 returns to the main processing apparatus 2. In other words, the communication frame 50 is cyclically transmitted to the main processing apparatus 2 and the remote apparatuses 40_1, 40_2, 40_3, . . . , 40_N.

More specifically, the communication frame 50 includes a header 51, data areas 52, 53 and 54 assigned to the respective slave apparatuses, and a footer 55. The destination and various types of attribute information of the communication frame are stored in the header 51. OUT data and IN data for corresponding slave apparatuses are stored in the data areas 52, 53 and 54. Information such as an end code and parity bit is stored in the footer 55.

The master apparatus generates the communication frame 50 by writing, in the data areas assigned to target slave apparatuses, OUT data to be given to the respective slave apparatuses, and sends out the communication frame 50 to the target slave apparatuses. Upon receiving the communication frame 50 from an upper side (upstream), each of the slave apparatuses extracts OUT data destined for that slave apparatus from the data area assigned to that slave apparatus, in the received communication frame 50, and writes, in the data area assigned to that slave apparatus, IN data collected by the slave apparatus so as to regenerate the communication frame 50, and sends out the communication frame 50 to a lower side (downstream). The communication frame 50 is cyclically transferred in this manner, and thereby OUT data and IN data are sequentially updated.

That is to say, in the field network 4 according to this embodiment, the communication frame 50 in which OUT data (command values) destined for all the slave apparatuses is stored is sent out from the master apparatus, and the communication frame 50 after the OUT data (command values) and IN data (feedback values) are exchanged in each of the slave apparatuses returns to the master apparatus. In other words, data exchange between the master apparatus and each of the slave apparatuses is completed by the communication frame 50 making one round (circulation).

E. OVERVIEW

Figure 5:
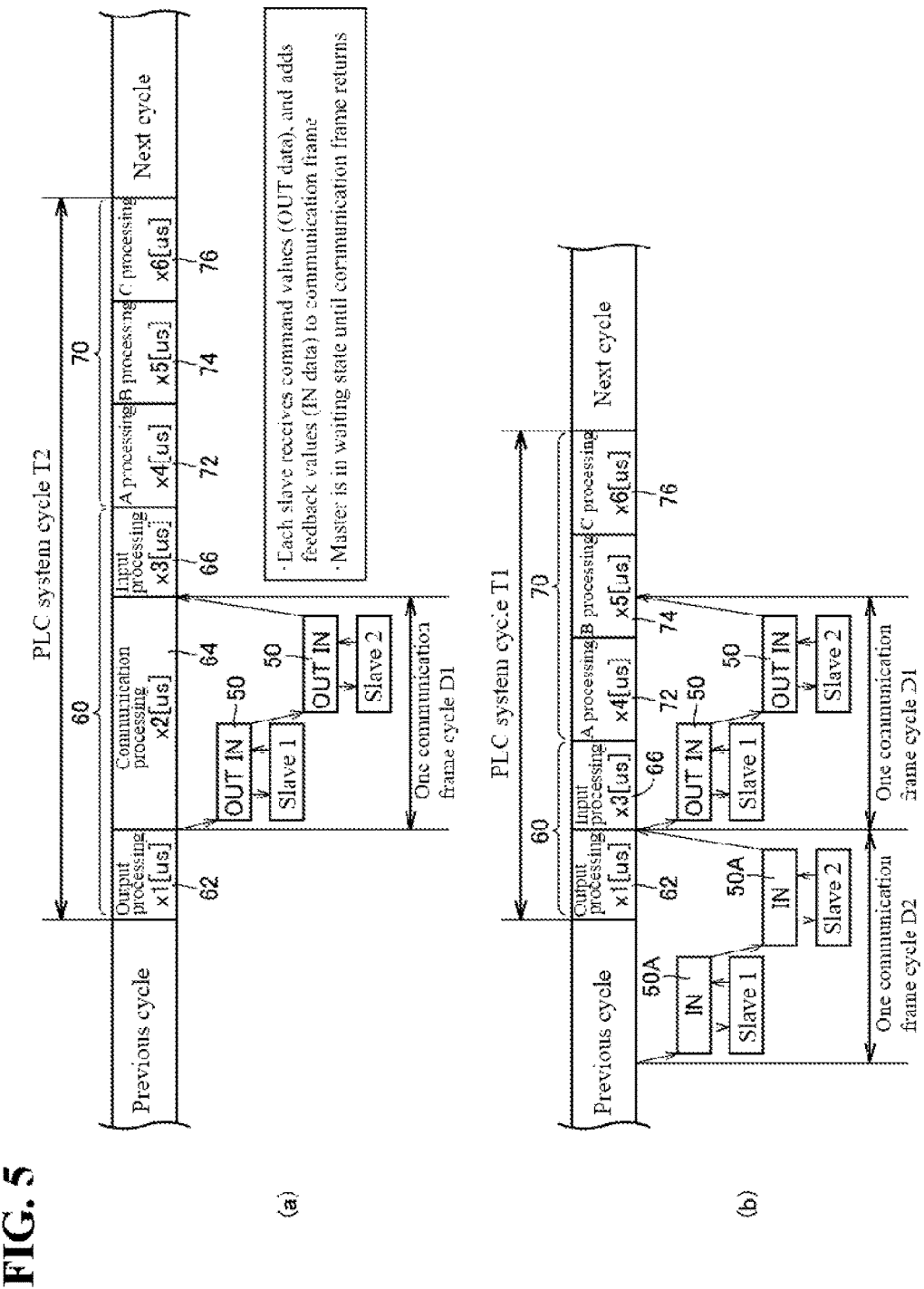
FIGS. 5(a) and 5(b) are diagrams illustrating an overview of processing included in the PLC system according to the embodiment.

Next, the overview of processing in the PLC system 1 according to this embodiment will be described. FIGS. 5(a), (b) are diagrams illustrating the overview of processing included in the PLC system 1 according to this embodiment. FIG. 5(a) is a diagram illustrating repeated execution of a program in a CPU unit according to a related technique, and FIG. 5(b) is a diagram illustrating repeated execution of a program in the CPU unit 10 according to this embodiment.

As shown in FIG. 5(a), in the CPU unit 10, a control-related program is repeatedly executed in cycles. The execution cycle of this program is also referred to as a "PLC system cycle" below. Programs that are executed include a system program 60 and a user program 70. The system program 60 is a program for executing processing required for an appropriate operation of the PLC system 1, and typically includes output processing 62, communication processing 64 and input processing 66.

The output processing 62 includes processing for aggregating OUT data calculated by executing the user program 70 or the like and generating the communication frame 50 (also referred to as "framing processing", for example). The communication processing 64 includes processing for transmitting the generated communication frame 50 to slave apparatuses, and processing for collecting IN data from the communication frame 50 that has returned after circulating through all the slave apparatuses. The input processing 66 includes processing for updating internal data (or internal variables) that is based on the IN data collected from the returned communication frame 50.

The user program 70 is a program generated as desired by the user of the PLC system 1 in accordance with a purpose and an application, and may be subdivided into one or a plurality of portions in accordance with contents to be controlled, a control target, control application or the like. For example, the user program 70 can include a sequence control logic, a motion control logic, a PID control logic and the like. Moreover, a priority order of an execution cycle or execution may be set in a user program subdivided into a plurality of portions. At this time, there are cases where an execution cycle that is set for the user program is longer than a PLC system cycle (usually, an integral multiple of the PLC system cycle), and in this case, the program will be executed over a plurality of PLC system cycles. In the example shown in FIG. 5(a), the user program 70 includes A processing 72, B processing 74 and C processing 76.

As shown in FIGS. 5(a), (b), the processor 100, which is a calculation unit, is configured to repeatedly execute the output processing 62 and the input processing 66 in a predetermined execution cycle (PLC system cycle), and to repeat program execution processing (execution processing of the user program 70) during a time period when the output processing 62 and the input processing 66 are not executed. Here, the input processing 66 includes processing for updating input data in accordance with information (field information or IN data) that is collected from the control target by one or more slave apparatuses (the remote apparatuses 40). The output processing 62 includes processing for generating output data (communication frame or OUT data) that includes an execution result of the program execution processing (processing for executing the user program 70).

The system program 60 is necessarily executed one time for each PLC system cycle. As shown in FIG. 5(a), in the communication processing 64 of the system program 60, the communication frame 50 is sent out from the master apparatus, and unless the communication frame 50 circulates through all the slave apparatuses and returns to the master apparatus, update of OUT data and IN data between the master apparatus and the slave apparatuses cannot be completed.

Specifically, each of the slave apparatuses receives a command value (OUT data) from the communication frame 50, and adds a feedback value (IN data) to the communication frame 50. At this time, the master apparatus is in a waiting state until the communication frame 50 returns. The time required for the communication frame 50 sent out from the master apparatus to return to the master apparatus (hereinafter, also referred to as "one communication frame cycle D") is extended depending on the number of slave apparatuses connected to the field network 4.

A PLC system cycle T2 corresponds to the total of the time required for executing the system program 60 (x1+x2+x3), and the time required for executing the user program 70 (x4+x5+x6). Here, there are cases where the user program 70 includes processing for which high-speed execution (repeated execution in a shorter cycle) like a motion control logic (continuous control logic of position (angle) of a multi-axis robot or the like) is requested, for example. Therefore, there is a demand that the PLC system cycle T2 is made as short as possible.

Considering speeding up of such a PLC system cycle T2, the time required for the system program 60 to execute the communication processing 64 is relatively long as shown in FIG. 5(a). This is because the system program 60 has to wait until the communication frame 50 that has been sent out returns.

The present inventors focused on this waiting state in communication processing, and arrived at a new solution by shortening the PLC system cycle T2 by reducing the duration of this waiting state as much as possible or to zero. This new solution will be described with reference to FIG. 5(b).

Referring to FIG. 5(b), the CPU unit 10 according to this embodiment sends out, in one PLC system cycle, a communication frame 50A for mainly collecting IN data as well as a communication frame 50 that is similar to that in FIG. 5(a). By appropriately setting a sending timing of this communication frame 50A, the time required for communication processing can be virtually ignored. Specifically, if the communication frame 50A for collecting IN data has returned to the master apparatus before the execution start of the input processing 66 that requires IN data collected from each slave apparatus, the input processing 66 can be immediately executed.

In the CPU unit 10 according to this embodiment, the time required for communication processing can be made virtually zero, and a system program 65 that is executed will virtually include the output processing 62 and the input processing 66 only. Accordingly, before the communication frame 50 in the related technique shown in FIG. 5(a) is sent out from the master apparatus, the communication frame 50A for collecting IN data (feedback values) is sent out. Thereby, there is no waiting for the execution start of the input processing 66 and the communication frame 50 generated by the output processing 62 can be immediately sent out.

Accordingly, the communication controller 110 (communication processing unit) starts cyclic transmission of the communication frame 50 (first data sequence) containing OUT data (output data or command values) for the one or more remote apparatuses 40 (slave apparatuses) in conjunction with execution of the output processing 62 in the processor 100 (calculation unit). In addition, the communication controller 110 (communication processing unit) starts, a predetermined time period before execution start of the input processing 66 in the processor 100 (calculation unit), cyclic transmission of the communication frame 50A (second data sequence) for obtaining information (field information or IN data) to be collected by the one or more remote apparatuses 40 (slave apparatuses) from the control target. Note that a sending start timing of the communication frame 50A may be any timing, as long as the communication frame 50A that has been sent out collects IN data from all the slave apparatuses and returns to the master apparatus before start of the input processing 66 in a corresponding PLC system cycle. However, sending of the communication frame 50 should not be affected, and thus a timing when the communication frame 50A has been sent out and then returned to the master apparatus is preferably set to immediately before the start of the input processing 66.

Moreover, the communication frame 50 may be sent out from the master apparatus after the communication frame 50A is sent out from the master apparatus and before the communication frame 50A returns to the master apparatus. Conversely, the communication frame 50A may be sent out from the master apparatus after the communication frame 50 is sent out from the master apparatus and before the communication frame 50 returns to the master apparatus. In other words, as long as the sending time periods of the communication frame 50 and the communication frame 50A do not overlap, sending start timings of those communication frames can be set as appropriate.

Accordingly, one communication frame can be sent out after the other communication frame is sent out, independently from this communication frame circulating through the field network 4 and arriving at the master apparatus. In other words, a timing when one communication frame makes a circulation and then arrives at the master apparatus, and a sending timing of the other communication frame can be determined independently of each other.

Such processing can make the waiting time in the master apparatus virtually zero. As is clear from the comparison of time charts shown in FIGS. 5 (a) and 5(b), the length of PLC system cycle can be reduced by the time required for the communication processing 64.

F. METHOD FOR DETERMINING SENDING TIMING

Next, several methods for determining a timing of sending out the communication frame 50A will be illustrated.

(1) Method for Determining One Communication Frame Cycle by Actual Measurement

As shown in FIG. 5(b), if a time until the communication frame 50A returns to the master apparatus after being sent out from the master apparatus and circulating through all the slave apparatuses, namely, one communication frame cycle D2 is known, a timing of sending the communication frame 50A can be determined. Accordingly, it is sufficient that the communication frame 50A is sent out at a timing of the duration of the one communication frame cycle D2 before a start timing of the input processing 66.

In the processor 100, the execution timing of a control-related program (the system program 65 and the user program 70) is known, and thus the start timing of the input processing 66 can be known in advance. Therefore, in synchronization with the execution of the system program 65 and the user program 70, a sending timing of the communication frame 50A is determined in accordance with the length of the one communication frame cycle D2. Accordingly, the one communication frame cycle D2 corresponds to an offset value for determining a sending timing of the communication frame 50A.

Typically, the one communication frame cycle D2 is actually measured in initialization processing executed when configuring the field network 4 using a master apparatus and one or more slave apparatuses. Accordingly, necessary information is exchanged between the master apparatus and the one or more slave apparatuses as initialization processing in order to establish a network between those apparatuses, and in this information exchange, the one communication frame cycle D2 is also actually measured. This measured length of the one communication frame cycle D2 is held in the CPU unit 10, and this value is used for determining a sending timing of the communication frame 50A as necessary. Accordingly, the length of the one communication frame cycle D2 is included in the initial configuration result of the network.

The main processing apparatus 2 (master apparatus) determines a timing for sending out the communication frame 50A (second data sequence) in this manner, based on an offset value stored in advance, using a timing of execution start of the input processing 66 as a reference. Typically, the main processing apparatus 2 (master apparatus) determines the offset value based on the initial configuration result of the network.

(2) Method for Determining One Communication Frame Cycle by Simulation

As described above, instead of the method for determining one communication frame cycle by actual measurement, one communication frame cycle may be calculated in a predictive manner by simulation or the like. More specifically, it is possible to estimate the time required for the communication frame 50A circulating through the field network 4, based on the number of slave apparatuses that are connected to the field network 4, the type of each slave apparatus (the processing ability and data processing amount of each slave apparatus can be estimated) and the like. Without performing actual measurement, the one communication frame cycle D can be estimated in advance, and thus the designing of a program can be more simplified.

At this time as well, the one communication frame cycle D2 is used as an offset value for determining a sending timing of the communication frame 50A. Specifically, the main processing apparatus 2 (master apparatus) determines a timing for sending out the communication frame 50A (second data sequence) based on offset value stored in advance, using a timing of execution start of the input processing 66 as a reference. This offset value (the one communication frame cycle D2) may be determined by simulation, as described above.

Note that it is assumed that in the field network 4, a common timer (counter) is provided such that the master apparatus and each slave apparatus can be synchronized. Therefore, a timing for sending out the communication frame 50A (second data sequence) may be determined as an absolute value of a time (count number) counted by the common timer (counter), or may be determined as a relative value using an execution start timing of the input processing 66 as a reference.

G. DATA STRUCTURE OF COMMUNICATION FRAME AND PROCESSING IN SLAVE APPARATUS

Next, the communication frames 50 and 50A, and processing in a slave apparatus will be described. As described above, basically, it is sufficient that the communication frame 50A can collect IN data. Therefore, as a data structure of the communication frame 50A, a structure dedicated to the collection of IN data may be adopted, or the same structure as that of the communication frame 50 may be adopted.

Several data structures of the communication frames 50 and 50A, and processing in a slave apparatus corresponding to each of the data structures will be described below.

Figure 6:
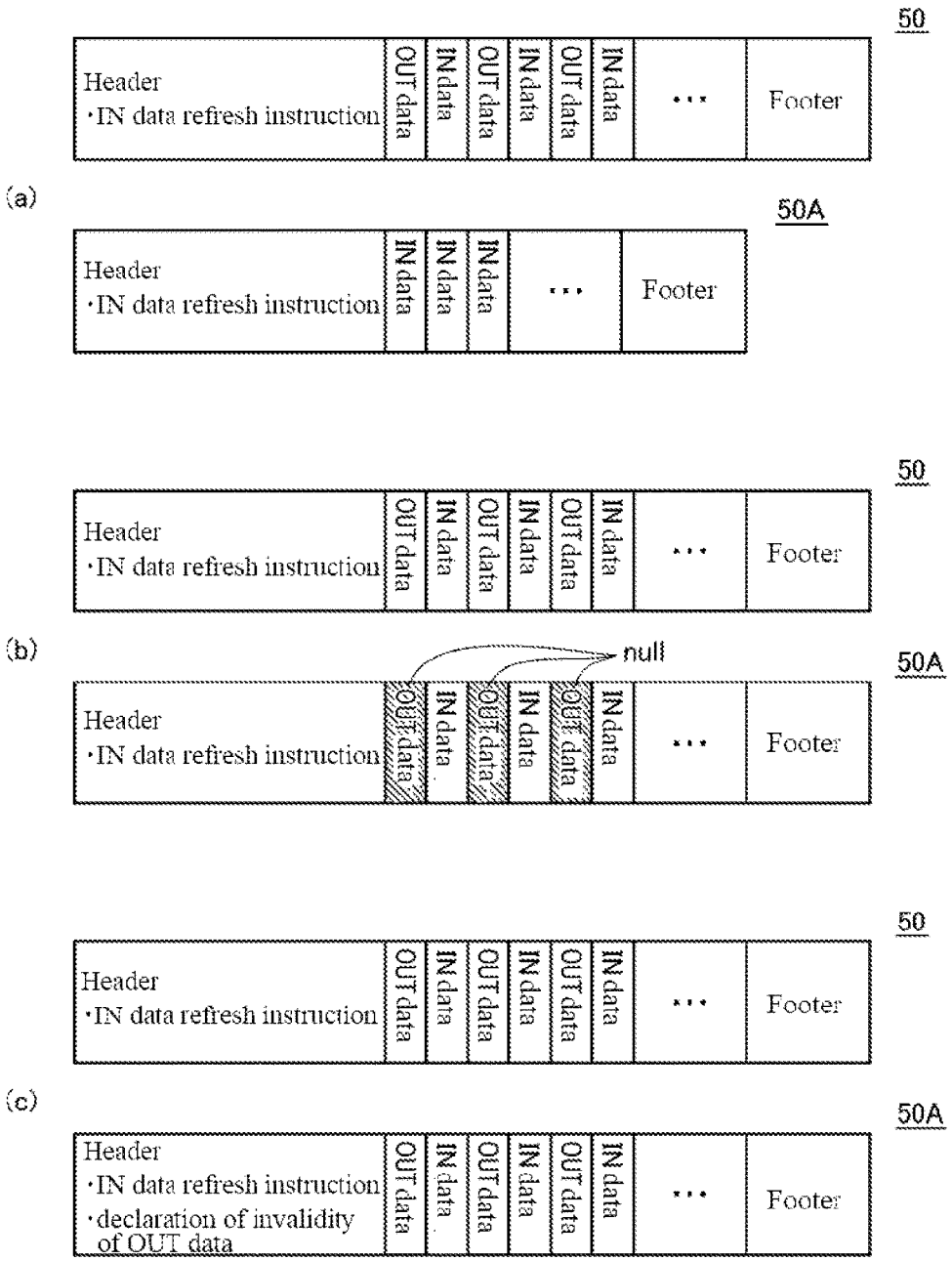
FIGS. 6(a) to 6(c) are diagrams showing an example of a data structure of a communication frame used in the PLC system according to the embodiment.

FIGS. 6(a)-(c) are diagrams showing an example of the data structure of a communication frame used in the PLC system 1 according to this embodiment.

(1) Adopting a Shortened Communication Frame as the Communication Frame 50A

In FIG. 6(a), an example is shown in which a structure shortened compared to the data structure of the communication frame 50 is adopted as the data structure of the communication frame 50A. More specifically, in the normal communication frame 50, data areas for OUT data and IN data assigned to respective slave apparatuses are provided between a header and a footer. An instruction that instructs each of the slave apparatuses to write, in the data area for IN data assigned to the slave apparatus, field information that is input in the slave apparatus (IN data refresh instruction) is stored in the header. Each slave apparatus writes the latest feedback value in the data area for IN data assigned to the slave apparatus, in accordance with the IN data refresh instruction in the header. At the same time, each slave apparatus reads out OUT data (command value) from the data area for OUT data assigned to the slave apparatus, and executes processing.

In contrast, in the shortened communication frame 50A shown in FIG. 6(a), the data areas for OUT data are deleted, and only the data areas for IN data exist. The IN data refresh instruction to each slave apparatus is stored in the header, and thus each slave apparatus writes the latest feedback value in the data area for IN data assigned to the slave apparatus in accordance with the IN data refresh instruction in the header. This makes it possible to realize collection of IN data using the communication frame 50A. In addition, data areas for OUT data do not exist, and thus the frame length (data amount) of the communication frame 50A can be reduced. Accordingly, one communication frame cycle of the communication frame 50A can be shortened further, and a time margin for the communication frame 50 can be increased.

(2) Setting an Invalid Value as OUT Data of the Communication Frame 50A

Next, an example is illustrated in which the communication frame 50A shown in FIG. 6(b) has the same data structure as the communication frame 50. Specifically, in the example shown in FIG. 6(b), the communication frame 50 (first data sequence) and the communication frame 50A (second data sequence) have the same data structure.

Here, an invalid value is set as OUT data of the communication frame 50A. In the example shown in FIG. 6(b), a "null value" is stored in each of the data areas for OUT data of the communication frame 50A, and the slave apparatuses cannot read out a valid OUT data when they receive the communication frame 50A. That is, the OUT data (output data) contained in the communication frame 50A (second data sequence) is invalidated.

Note that the value in each data area for OUT data may also be invalidated by storing, in the data area, a value that cannot be OUT data (e.g., a negative value) instead of a "null value".

The communication frame 50 and the communication frame 50A have the same data structure, and thus both include an IN data refresh instruction. Specifically, both the communication frame 50 (first data sequence) and the communication frame 50A (second data sequence) include a command for obtaining information from a slave apparatus (IN data refresh instruction) and OUT data (output data).

Processing for generating a communication frame in the master apparatus can be commonalized by commonalizing the data structure of the communication frame 50 and the communication frame 50A in this manner, and it becomes possible to avoid the complication of an implementation mode in order to realize processing according to this embodiment.

(3) Declaring that the OUT Data of the Communication Frame 50A has an Invalid Value Also in FIG. 6(c), an example is shown in which the communication frame 50A has the same data structure as the communication frame 50. In other words, in the example shown in FIG. 6(b), the communication frame 50 (first data sequence) and the communication frame 50A (second data sequence) have the same data structure.

A command value (OUT data) calculated by the most recent execution of a program required for controlling a control target is stored in the OUT data of the communication frame 50A as well, similarly to the communication frame 50. However, a declaration (declaration of invalidity of OUT data) indicating to each slave apparatus that the instruction values stored in the data areas for OUT data are invalid is stored in the header. In accordance with this declaration of invalidity of OUT data, each slave apparatus executes processing for discarding a received command value (OUT data). Accordingly, each of the slave apparatuses is configured to discard the output data included in the communication frame 50A (second data sequence). In the example shown in FIG. 6(c), the OUT data (output data) included in the communication frame 50A (second data sequence) is virtually invalidated by using the declaration of invalidity of OUT data.

Note that any values stored in the data areas for OUT data are invalidated due to declaration of invalidity of OUT data, and thus random values may be stored in the data areas. However, in terms of implementation, it is preferred to use OUT data calculated by the most recent program execution.

The communication frame 50 and the communication frame 50A have the same data structure, and thus both include a command (IN data refresh instruction) for obtaining information from slave apparatuses and OUT data (output data).

Processing for generating a communication frame in the master apparatus can be commonalized by commonalizing the data structure of the communication frame 50 and the communication frame 50A in this manner, and it becomes possible to avoid the complication of the implementation mode in order to realize processing according to this embodiment.

(4) Resending, as the Communication Frame 50A, the Communication Frame 50 that was Previously Sent Out In FIGS. 6(a) to 6(c), an example is shown in which the communication frame 50A whose data structure is different from that of the normal communication frame 50 is used, but perfectly the same communication frame as the communication frame 50 most recently sent out may be used as the communication frame 50A. In other words, the communication frame 50 sent out in the previous PLC system cycle may be sent out again in the current PLC system cycle. A pair of latest OUT data pieces is included in both the communication frames in common, and thus abnormal behavior of each slave apparatus does not occur.

By adopting such a configuration, an implementation configuration for realizing communication processing according to this embodiment can be further simplified.

(5) Other Configurations

Note that the communication frame 50A and the communication frame 50 do not necessarily need to have the same data structure. Furthermore, the data lengths of IN data and OUT data stored in each communication frame do not need to be the same. A minimum necessary data length may be dynamically selected in order to reduce the time required for transferring the communication frame. Alternatively, a configuration may be adopted in which optimum values for the data lengths of IN data and OUT data are estimated in advance from statistical information of communication frames on the network and the like, and the communication frame is determined so as to have the estimated data length.

H. IMPLEMENTATION EXAMPLES

Next, several implementation examples related to sending of a communication frame as described above will be illustrated.

Figure 7:
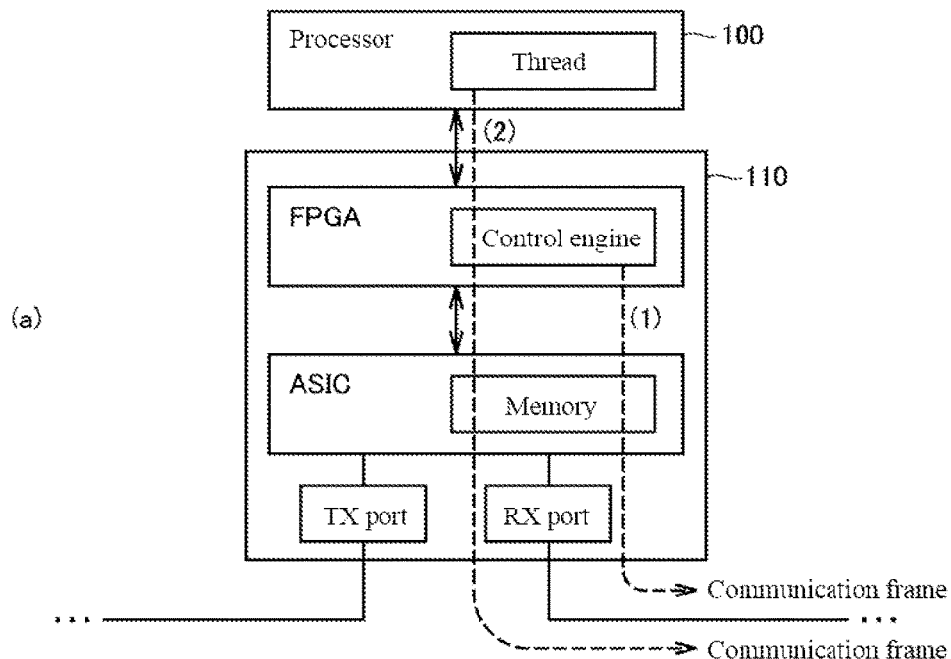
FIGS. 7(a) and 7(b) are diagrams showing an implementation example of the CPU unit according to the embodiment.
Figure 7:
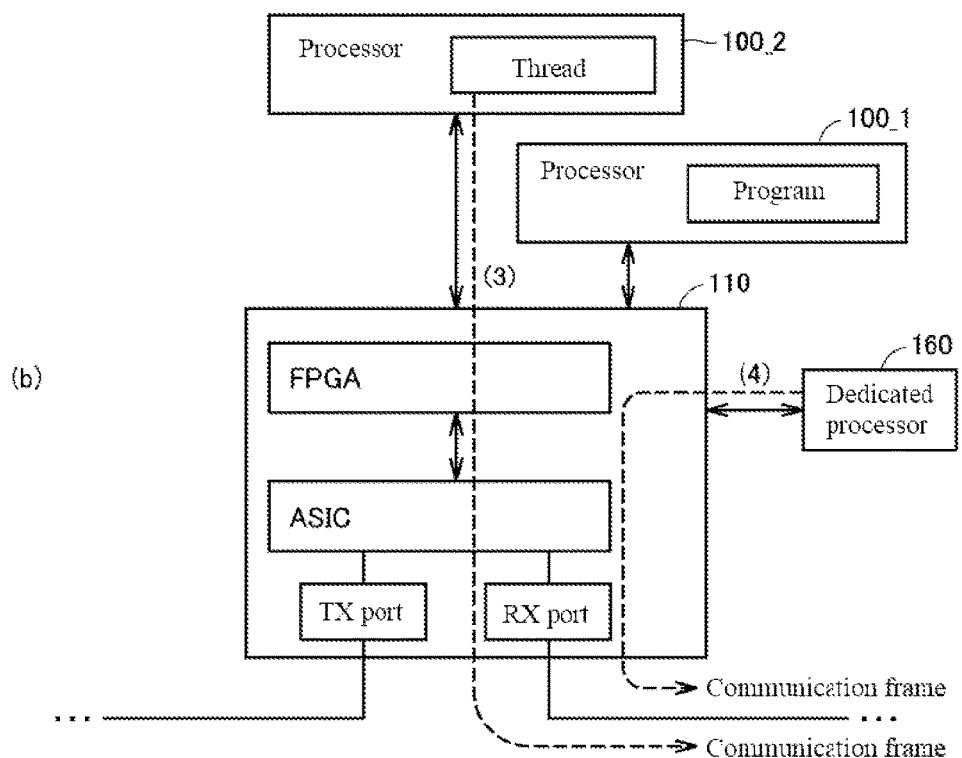

FIGS. 7(a), (b) are diagrams showing an implementation example of the CPU unit 10 according to this embodiment.
(1) Implementation Example in which Sending of a Communication Frame is Triggered Inside the Communication Controller 110

In the implementation example shown in FIG. 7(a), the communication controller 110 includes an FPGA in which a control engine is implemented, and an ASIC in which a signal processing circuit such as analog/digital conversion or a memory is implemented. In this implementation example, the FPGA in which the control engine is implemented generates internal signals, and thereby the communication frame 50A is generated and sent out. By using such an FPGA, the processor 100 does not need to manage timings and the like, and high-speed control is enabled.
(2) Implementation Example in which the Processor 100 Triggers Sending of a Communication Frame In the implementation example shown in FIG. 7(a), in the processor 100 that executes a program required for controlling a control target (e.g., a user program and a system program), a thread for managing timings may be executed such that the communication frame 50A is triggered from the thread. In this case, an internal command related to generation and sending of the communication frame 50A is given from the processor 100 to the communication controller 110.
(3) Implementation Example in which Another Processor Triggers Sending of a Communication Frame In the implementation example shown in FIG. 7(b), in addition to a processor 100_1 that executes a program (e.g., a user program or a system program) required for controlling a control target, another processor 100_2 for executing a thread for managing timing is implemented. The processor 100_2 triggers the communication frame 50A.
(4) Implementation Example in which a Dedicated Processor Triggers Sending of a Communication Frame In FIG. 7(b), an implementation example is shown in which a dedicated processor 160 connected to the communication controller 110 is provided. In this implementation example, the dedicated processor 160 manages timings, and gives an internal command for sending out the communication frame 50A to the communication controller 110, independently of the processor 100.

Four typical implementation examples were illustrated above, but the present invention is not limited to these implementation examples, and can be implemented using a combination of any software and/or hardware in accordance with the application, specification and the like that are demanded.

I. MODIFIED EXAMPLE

In the embodiment above, a ring type network is illustrated, but the present invention can be applied to a daisy chain type network as well. Such a daisy chain type network will be explained with reference to FIG. 8.

Figure 8:
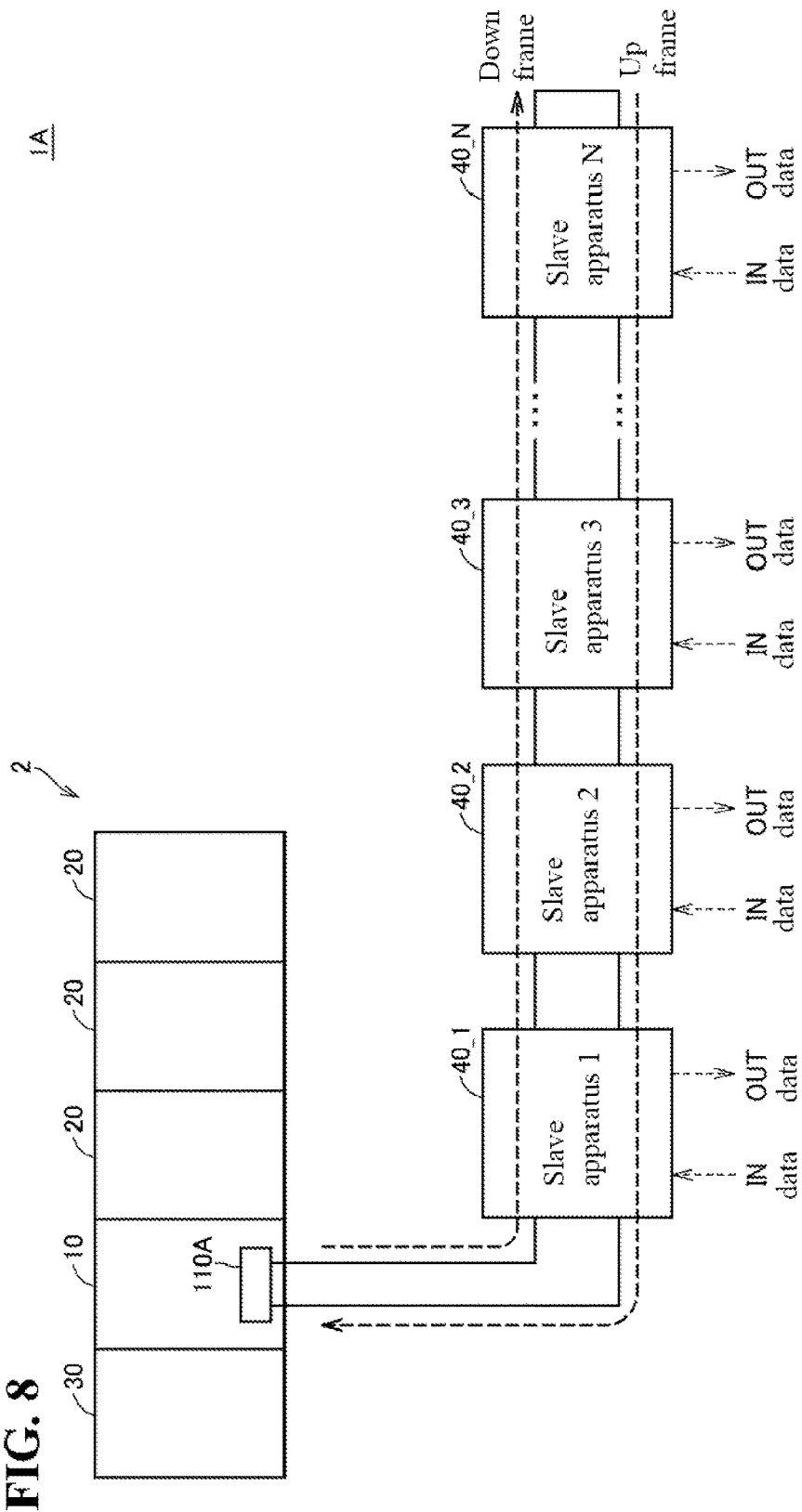
FIG. 8 is a schematic diagram showing an entire configuration of a PLC system according to a modified example of the embodiment.

FIG. 8 is a schematic diagram showing the entire configuration of a PLC system 1A according to a modified example of this embodiment. As shown in FIG. 8, the PLC system 1A includes the main processing apparatus 2 (master apparatus), and one or more remote apparatuses 40 (slave apparatuses), and these are connected via a field network of a daisy chain type. In the field network, communication frames are sequentially transferred from the master apparatus to the slave apparatuses (down frame), turn at an end portion, and are then sequentially transferred from the slave apparatuses to the master apparatus (up frame).

If such a daisy chain type is adopted, the CPU unit 10 will have a communication controller 110A adapted to a daisy chain type. Other configurations, processing and the like are similar to those described above, and thus their detailed description is not repeated.

Moreover, in the above-described embodiment and a modified example thereof, data transmission in a field network was illustrated, but the present invention can be applied to an internal bus that connects the CPU unit 10 and the IO units 20 in a PLC.

J. ADVANTAGES

According to this embodiment, in a configuration in which the master apparatus and the one or more slave apparatuses are connected to the network, processing for the master apparatus collecting field information from the one or more slave apparatuses via the network is executed in advance. Therefore, input processing that is executed after the collection of field information is complete is never waited for. Specifically, no waiting time occurs between processing for transmitting OUT data (command value) to each slave apparatus and processing for collecting IN data from each slave apparatus, and thus the cycle (PLC system cycle) for executing a program required for controlling a control target (including a user program and a system program) can be shortened. Accordingly, it is possible to provide an environment for executing a user program at a high speed. Accordingly, it is possible to execute a motion control logic and the like at a higher speed, and thus the control accuracy can be improved.

The embodiments disclosed herein should be considered as illustrative and not limiting in every respect. The scope of the present invention is indicated by the appended claims, not the above description, and all changes which come within the meaning and range of equivalency of the claims are intended to be embraced therein.

INDEX TO THE REFERENCE NUMERALS

1, 1A . . . PLC system, 2 . . . Main processing apparatus, 4 . . . Field network, 10 . . . CPU unit, 20 . . . IO unit, 30 . . . Power supply unit, 40 . . . Remote apparatus, 50, 50A . . . Communication frame, 51 . . . Header, 52, 53, 54 . . . Data area, 55 . . . Footer, 60, 65 . . . System program, 62 . . . Output processing, 64 . . . Communication processing, 66 . . . Input processing, 70 . . . User program, 100 . . . Processor, 102 . . . Main memory, 104 . . . Nonvolatile memory, 106 . . . Internal bus controller, 108, 109 . . . Internal bus, 110, 110A, 410 . . . Communication controller, 112, 412 . . . Shared memory, 120, 430 . . . Transmission buffer, 122, 432 . . . Transmission circuit, 130, 420 . . . Reception buffer, 132, 422 . . . Reception circuit, 160 . . . Dedicated processor, 400 . . . Calculation processing unit, 402 . . . Input circuit, 404 . . . Output circuit

The invention claimed is:

1. A control system for controlling a control target, comprising:
a master apparatus comprising:
a processor configured with a program to perform operations comprising:
operation as a calculation unit; and
operation as a communication processing unit; and
one or more slave apparatuses connected to the master apparatus via a network, wherein:
the processor is configured with the program to perform operations such that operation as the calculation unit comprises operation as the calculation unit configured to repeatedly execute, in a predetermined execution cycle, operations comprising:
output processing comprising generating output data comprising an execution result of a user program;
input processing comprising updating input data in the master apparatus according to information collected from the control target by one or more of the slave apparatuses; and
execution of the user program during a time period in which the output processing and the input processing are not executed; and
the processor is configured with the program to perform operations such that operation as the communication processing unit comprises operation as the communication processing unit configured:
to start cyclic transmission of a first data sequence comprising the output data for the one or more slave apparatuses after the execution of the output processing such that the cyclic transmission of the first data sequence occurs concurrently with at least one of: the input processing; and the execution of the user program; and
to start cyclic transmission of a second data sequence for obtaining information collected by the one or more slave apparatuses from the control target such that the cyclic transmission of the second data sequence completes before the input processing of a next execution cycle and the cyclic transmission of the second data sequence occurs concurrently with at least one of: the output processing; and the execution of the user program.

2. The control system according to claim 1, wherein the processor is configured with the program to perform operations such that operation as the communication processing unit comprises operation as the communication processing unit configured to, after the cyclic transmission of the first data sequence is started, start the cyclic transmission of the second data sequence, independently from arrival of the first data sequence at the master apparatus after the cyclic transmission of the first data sequence.

3. The control system according to claim 1, wherein the first data sequence and the second data sequence comprise a same data structure.

4. The control system according to claim 1, wherein both the first data sequence and the second data sequence comprise a command for obtaining information from the one or more slave apparatuses and the output data.

5. The control system according to claim 4, wherein the output data contained in the second data sequence is invalidated.

6. The control system according to claim 4, wherein
each of the one or more slave apparatuses is configured to discard the output data contained in the second data sequence.

7. The control system according to claim 1, wherein
the processor is configured with the program to perform operations comprising determining a time at which the cyclic transmission of the second data sequence is started based on an offset value using a time at which the input processing is started as a reference.

8. The control system according to claim 7, wherein
the processor is configured with the program to determine the offset value based on an initial configuration result of the network.

9. A control apparatus for controlling a control target, comprising a processor configured with a program to perform operations comprising:
operation as a calculation unit; and
operation as a communication processing unit coupled to the calculation unit, wherein:
the control apparatus is connected to one or more slave apparatuses via a network;
the processor is configured with the program to perform operations such that operation as the calculation unit comprises operation as the calculation unit configured to repeatedly execute, in a predetermined execution cycle, operations comprising:
output processing comprising generating output data comprising an execution result of a user program;
input processing comprising updating input data in the control apparatus according to information collected from the control target by the one or more slave apparatuses; and
execution of the user program during a time period in which the output processing and the input processing are not executed; and
the processor is configured with the program to perform operations such that operation as the communication processing unit comprises operation as the communication processing unit configured:
to start cyclic transmission of a first data sequence comprising the output data for the one or more slave apparatuses after the execution of the output processing such that the cyclic transmission of the first data sequence occurs concurrently with at least one of: the input processing; and the execution of the user program; and
to start cyclic transmission of a second data sequence for obtaining information collected by the one or more slave apparatuses from the control target such that the cyclic transmission of the second data sequence completes before the input processing of a next execution cycle and the cyclic transmission of the second data sequence occurs concurrently with at least one of: the output processing; and the execution of the user program.

10. A control method in a control apparatus for controlling a control target, wherein the control apparatus is connected to one or more slave apparatuses via a network, the method comprising:
repeatedly executing, in a predetermined execution cycle, output processing comprising generating output data comprising an execution result of a user program;
repeatedly executing, in the predetermined execution cycle input processing comprising updating input data in the control apparatus according to information collected from the control target by one or more of the slave apparatuses; and
repeatedly executing, in the predetermined execution cycle, the user program during a time period in which the output processing and the input processing are not executed;
starting cyclic transmission of a first data sequence comprising the output data for the one or more slave apparatuses after the execution of the output processing such that the cyclic transmission of the first data sequence occurs concurrently with at least one of: the input processing; and the execution of the user program; and
starting cyclic transmission of a second data sequence for obtaining information collected by the one or more slave apparatuses from the control target such that the cyclic transmission of the second data sequence completes before the input processing of a next execution cycle and the cyclic transmission of the second data sequence occurs concurrently with at least one of: the output processing; and the execution of the user program.

11. The method according to claim 10, wherein after the cyclic transmission of the first data sequence is started, the cyclic transmission of the second data sequence is started, independently from arrival of the first data sequence to the control apparatus after the cyclic transmission of the first data sequence.

12. The method according to claim 10, wherein both the first data sequence and the second data sequence comprise a same data structure.

13. The method according to claim 10, wherein both the first data sequence and the second data sequence comprise a command for obtaining information from the one or more slave apparatuses and the output data.

14. The method according to claim 13, wherein the output data contained in the second data sequence is invalidated.

15. The method according to claim 13, wherein each of the one or more slave apparatuses is configured to discard the output data contained in the second data sequence.

16. The method according to claim 10, further comprising determining a time at which the cyclic transmission of the second data sequence is started based on an offset value using a time at which the input processing is started as a reference.

17. The method according to claim 16, wherein the offset value is determined based on an initial configuration result of the network.

* * * * *